US009711165B2

(12) United States Patent
Hennequin

(10) Patent No.: US 9,711,165 B2
(45) Date of Patent: Jul. 18, 2017

(54) PROCESS AND ASSOCIATED SYSTEM FOR SEPARATING A SPECIFIED AUDIO COMPONENT AFFECTED BY REVERBERATION AND AN AUDIO BACKGROUND COMPONENT FROM AN AUDIO MIXTURE SIGNAL

(71) Applicant: AUDIONAMIX, Paris (FR)

(72) Inventor: Romain Hennequin, Paris (FR)

(73) Assignee: AUDIONAMIX, Paris (FR)

( * ) Notice: Subject to any disclaimer, the term of this patent is extended or adjusted under 35 U.S.C. 154(b) by 0 days.

(21) Appl. No.: 14/984,089

(22) Filed: Dec. 30, 2015

(65) Prior Publication Data

US 2016/0189731 A1 Jun. 30, 2016

(30) Foreign Application Priority Data

Dec. 31, 2014 (FR) ..................................... 14 63482
Dec. 9, 2015 (EP) .................................... 15198713

(51) Int. Cl.

*G10L 21/00* (2013.01)
*H04B 3/20* (2006.01)
*G10L 21/0308* (2013.01)
*G10L 19/02* (2013.01)
*G10L 21/02* (2013.01)
*G10L 21/0208* (2013.01)

(52) U.S. Cl.

CPC .......... *G10L 21/0308* (2013.01); *G10L 19/02* (2013.01); *G10L 21/0205* (2013.01); *G10L 21/0208* (2013.01); *G10L 2021/02082* (2013.01)

(58) Field of Classification Search

CPC ....... G10L 21/0308; G10L 2021/02082; G10L 21/0205; G10L 19/02; G10L 21/0208

See application file for complete search history.

(56) References Cited

U.S. PATENT DOCUMENTS

2009/0310444 A1* 12/2009 Hiroe .................... G01S 3/8006 367/125
2013/0282369 A1* 10/2013 Visser ................. G10L 21/0208 704/226
2015/0156578 A1* 6/2015 Alexandridis ......... H04R 3/005 381/92

OTHER PUBLICATIONS

Lee, Daniel D., et al., *"Learning the parts of objects by non-negative matrix factorization"*, *Nature*, vol. 401, pp. 788-791, (Oct. 21, 1999).

(Continued)

*Primary Examiner* — Muhammad N Edun
(74) *Attorney, Agent, or Firm* — Leydig, Voit & Mayer, Ltd.

(57) ABSTRACT

Processes are described herein for transforming an audio mixture for which a specific component is affected by reverberation, into a specific dry component (i.e. unaffected by the reverberation) and a background component. In the process described herein, the long-term effects of reverberation are explicitly taken into account by modelling the spectrogram of the specific component as the result of a matrix convolution along time between the spectrogram of the specific dry component and a reverberation matrix. Parameters of the model are estimated iteratively by minimizing a cost-function measuring the divergence between the spectrogram of the mixture signal and the model of the spectrogram of the mixture signal.

20 Claims, 4 Drawing Sheets

(56) References Cited

OTHER PUBLICATIONS

Durrieu, Jean-Louis, et al., "*An Iterative Approach to Monaural Musical Mixture De-Soloing", IEEE International Conference on Acoustics, Speech and Signal Processing*, 4 pages total, (2009).

Virtanen, Tuomas, "*Monaural Sound Source Separation by Non-negative Matrix Factorization with Temporal Continuity and Sparseness Criteria", IEEE Transactions on Audio, Speech, and Language Processing*, vol. 15, No. 3, pp. 1066-1074, (Mar. 2007).

Smaragdis, Paris, et al., "*Supervised and Semi-Supervised Separation of Sounds from Single-Channel Mixtures", ICA '07 Proceedings of the 7th International Conference on Independent Component Analysis and Signal Separation*, 8 pages. total, (2007).

Duong, Ngoc Q.K., et al., "*Under-determined reverberant audio source separation using a full-rank spatial covariance model", IEEE Transactions on Audio, Speech, and Language Processing*, vol. 18, No. 7, pp. 1-11, (2010).

Arberet, Simon, et al., "*Nonnegative matrix factorization and spatial covariance model for under-determined reverberant audio source separation*", pp. 1-4, *10TH International Conference on Information Sciences Signal Processing and their Applications* (*ASSPA*), 6 pages total, (May 2010).

Singh, Rita, et al., "*Latent-Variable Decomposition based Dereverberation of Monaural and Multi-Channel Signals", IEEE International Conference on Acoustics Speech and Signal Processing* (*ICASSP*) , 4 pages, (2010).

Smaragdis, Paris, et al., "*Non-Negative Matrix Factorization for Polyphonic Music Transcription", 2003 IEEE Workshop on Applications of Signal Processing to Audio and Acoustics*, pp. 177-180, (Oct. 19-22, 2003).

Vincent, Emmanuel, et al,, "*Adaptive harmonic spectral decomposition for multiple pitch estimation", IEEE Transactions on Audio, Speech and Language Processing, IEEE*, 18(3), 10 pages. total, (2010).

Ozerov, Alexey, et al., "*A General Flexible Framework for the handling of Prior Information in Audio Source Separation", IEEE Transactions on Audio, Speech and Language Processing*, 20(4), 17 pages total, (2011).

Ozerov, Alexey, et al., "*Multichannel Nonnegative Matrix Factorization in Convolutive Mixtures for Audio Source Separation", IEEE transactions on Audio, Speech, and Language Processing*, 18(3), pp. 550-563 (Mar. 2010).

Fevotte, Cédric, et al., "*Algorithms for nonnegative matrix factorization with the beta-divergence", Neural Computation*, 25 pages, (Mar. 2011).

Vincent, Emmanuel, "*Performance measurement in blind audio source separation", IEEE Transactions on Audio, Speech, and Language Processing, institute of Electric and Electronics Engineers*, 14(4), 10 pages total, (2006).

French Preliminary Research Report and Written Opinion for French Application No. 1463482, filed Dec. 31, 2014, (13 pages).

Hennequin, Romain, et al., "*Internal Research Report: Long-Term Reverberation Modeling in Under-Determined Audio Source Separation*", (5 pages), unpublished, date no later than Jan. 8, 2016.

* cited by examiner

PROCESS AND ASSOCIATED SYSTEM FOR SEPARATING A SPECIFIED AUDIO COMPONENT AFFECTED BY REVERBERATION AND AN AUDIO BACKGROUND COMPONENT FROM AN AUDIO MIXTURE SIGNAL

CROSS-REFERENCE TO RELATED APPLICATIONS

This patent application claims priority of co-pending EP Patent Application No. 15198713.8, filed Dec. 9, 2015 and FR Patent Application No. 1463482, filed Dec. 31, 2014, each of which is herein incorporated by reference in its entirety and for all that it describes.

TECHNICAL FIELD

The present application relates to the field of processes and systems for separation of a plurality of components in a mixture of acoustic signals and in particular the separation of a vocal component affected by reverberation and of a musical background component in a mixture of acoustic signals.

BACKGROUND

A soundtrack of a song is composed by a vocal component (the lyrics sung by one or more singers) and a musical component (the musical accompaniment or background played by one or more instruments). A soundtrack of a film has a vocal component (dialogue between actors) superimposed on a musical component (sound effects and/or background music). There are certain instances where one needs to separate a vocal component from a musical component in a soundtrack. For example, in a film, one may need to isolate the background component from the vocal component in order to use a dubbed dialogue in a different language to produce a new soundtrack.

Several algorithms which aim at separating the vocal component from the musical component exist in the literature. For example, the article by Jean-Louis Durrieu et al. "An Iterative Approach to Musical Mixture of Monaural-Soloing," in International Conference on Acoustics, Speech, and Signal Processing (ICASSP), Taipei, Taiwan, April 2009, pp. 105-108 discloses a source separation algorithm in under-determined conditions based on a Non-negative Matrix Factorization (NMF) framework, that allows specifically for the separation of the vocal contribution from a music background contribution. However, known separation algorithms do not explicitly and properly deal with the reverberation effects that affect the components of the mixture.

In the particular case of a vocal component, the reverberated voice results from the superposition of the dry voice, corresponding to the recording of the sound produced by the singer that propagates directly to the microphone, and the reverb, corresponding to the recording of the sound produced by the singer that arrives indirectly to the microphone, i.e. by reflection, possibly multiple, on the walls of the recording room. The reverberation, composed of echoes of the pure voice at given instants, spreads over a time interval that may be significant (e.g. three seconds). Stated otherwise, at a given instant, the vocal component results from the superposition of the dry voice at this instant and the various echoes of the pure voice at preceding instants.

Existing separation algorithms do not take into account the long-term effects of reverberation affecting a component of the mixture of acoustic signals. The article by Ngoc Duong Q K, Emmanuel Vincent, and Remi Gribonval, "Underdetermined Reverberant Sound Source Separation Using a Full-Rank Spatial Covariance Model," IEEE Transactions on Audio, Speech, and Language Processing, Vol. 18, no. 7, pp. 1830-1840, September 2010, focuses on the instantaneous effects of reverberation related to the spatial diffusion, but does not model memory effects, i.e. the delay between the recording of a dry sound and the recording of the echoes associated to that dry sound. Thus, the type of algorithm proposed by the authors of the article applies only to multi-channel signals and does not allow for a correct extraction of reverberation effects which are common in music. Thus, the reverberation that affects a specific component, for example the vocal component, is distributed in the various components obtained after the separation. As a result, the separated vocal component then loses its richness and the musical accompaniment component is not of good quality.

BRIEF SUMMARY

Embodiments of the disclosure provide a method and system for separation of components in a mixture of audio components, where the components incorporate reverberations of a corresponding dry signal. For example, embodiments of the disclosure may be used to separate a dry vocal component x(t) affected by reverberation from a musical background component z(t) in a mixture acoustic signal w(t). The system includes non-transitory computer readable medium containing computer executable instructions for separating the components. The medium includes computer executable instructions to run an estimation-correction loop that includes, at each iteration, an estimation function and a correction function. The steps in the estimation-correction loop include first using a model of spectrogram of the mixture acoustic signal $\hat{V}^{rev}$ corresponding to the sum of a model of spectrogram of a specific acoustic signal affected by reverberation $\hat{V}^{rev,y}$ and of a model of spectrogram of the background acoustic signal $\hat{V}^{z}$, the model of spectrogram of the specific acoustic signal affected by reverberation being related to the model of spectrogram of the specific dry acoustic signal model $\hat{V}^{x}$ according to:

$$\hat{V}^{rev,y}_{f,t} = \sum_{\tau=1}^{T} \hat{V}^{x}_{f,t-\tau+1} R_{f,\tau}$$

where R is a reverberation matrix of dimensions F×T, f is a frequency index, t is a time index, and i an integer between 1 and T; and computing iteratively an estimation of the model of spectrogram of the background acoustic signal $\hat{V}^{z}$, of the model of spectrogram of the specific dry acoustic signal $\hat{V}^{x}$ and of the reverberation matrix R so as to minimize a cost-function (C) between the spectrogram of the mixture acoustic signal V and the model of spectrogram of the mixture acoustic signal $\hat{V}^{rev}$.

BRIEF DESCRIPTION OF THE DRAWINGS

Embodiments of the disclosure will be described in even greater detail below based on the exemplary figures. The present application is not limited to the exemplary embodiments. All features described and/or illustrated herein can be used alone or combined in different combinations in embodiments. The features and advantages of various embodiments of the disclosure will become apparent by reading the following detailed description with reference to the attached drawings which illustrate the following.

DETAILED DESCRIPTION

Figure 1:
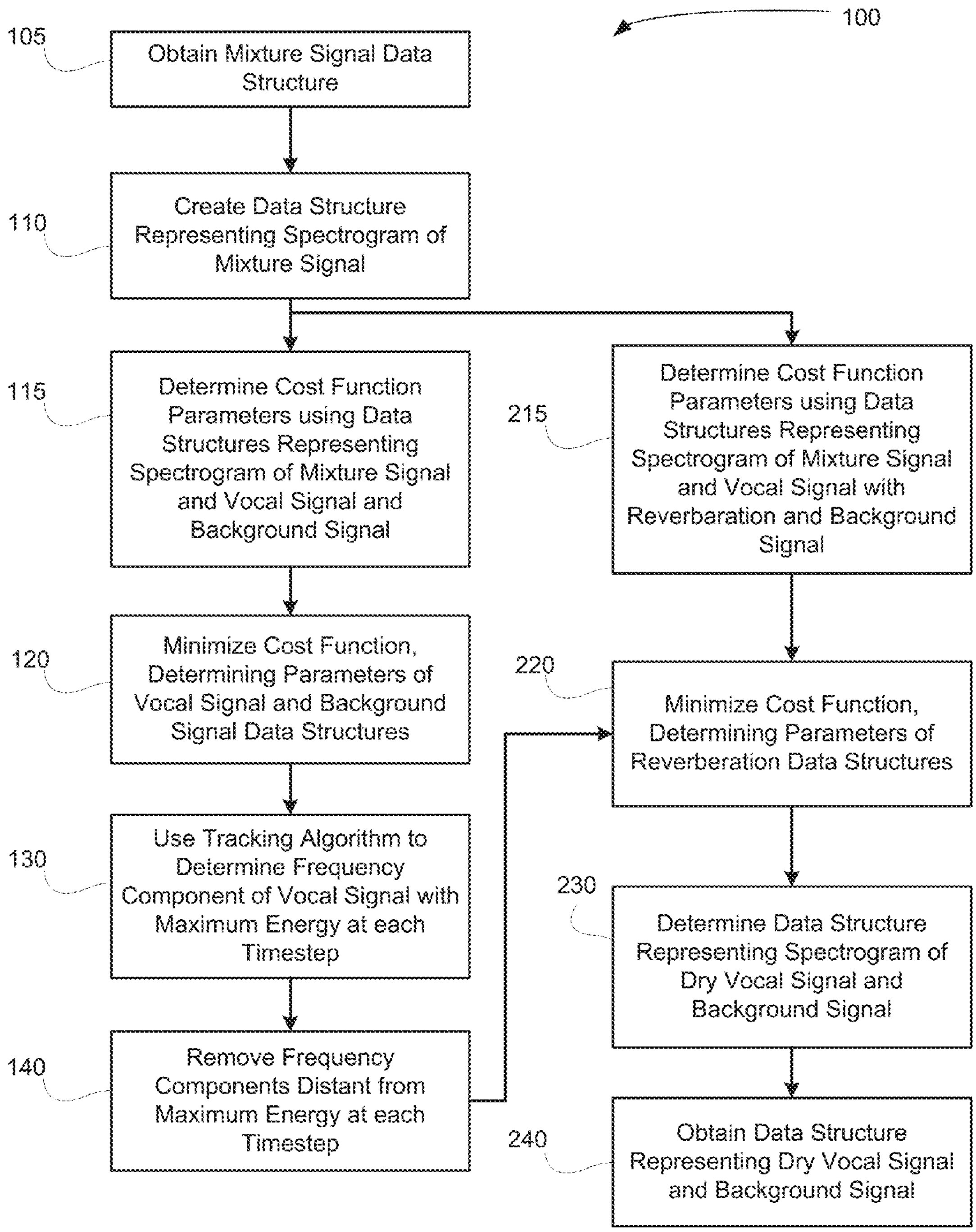
FIG. 1 is a flow diagram representation of a process for transforming an audio mixture signal data structure into isolated audio component signal data structures according to one implementation of the disclosure.

FIG. 1 is a flow diagram representation of a process 100 for transforming an audio mixture signal data structure into isolated audio component signal data structures according to one implementation of the disclosure. All references to signals throughout the remainder of the description of FIG. 1 are references to audio signals, and therefore the adjective "audio" may be omitted when referring to the various signals. Furthermore, in the description of the implementation depicted in FIG. 1, it is contemplated that the audio signals are monophonic signals. However, alternative implementations contemplate transforming stereophonic and multichannel audio signals. Those skilled in the art know how to adapt the processing presented in the description of FIG. 1 in detail herein to process stereophonic or multichannel signals. For example, an extra panning parameter can be used in all model signal data structures.

In FIG. 1, the process 100 transforms a mixture signal data structure w(t) to a vocal signal data structure y(t) and a musical background signal data structure z(t) (background signal data structure, for short). All input and output signals are functions of time. In the filtering process depicted in FIG. 1, the mixture signal data structure w(t) is a representation, stored on a computer readable medium, of acoustical waves that constitute a source soundtrack or an excerpt of a source soundtrack.

The mixture signal data structure w(t) represents acoustical waves that comprise at least a first and a second component. In an embodiment, the first component is referred to as specific and may be a vocal component corresponding to lyrics sung by a singer, and the second component is referred to as background and may be a musical component corresponding to accompaniment of the singer.

The vocal signal data structure y(t) is a representation, computed and stored on a computer readable medium, of acoustical waves that represent the first component of the acoustical waves represented by the mixture signal data structure w(t) isolated from the remaining components of the acoustical waves represented by the mixture signal data structure. The background signal data structure z(t) is a representation, computed and stored on a computer readable medium, of acoustical waves that represent the second component of the acoustical waves represented by the mixture signal data structure w(t) isolated from the remaining components of the acoustical waves represented by the mixture signal data structure w(t).

In the embodiment of FIG. 1, it is assumed that only the vocal signal data structure y(t) or the vocal component is reverberated. The reverberation is modelled as:

$$y(t)=r(t)*x(t)$$

where x(t) is the dry vocal signal data structure, i.e. the acoustic signal produced by the singer which propagates directly to the microphone; and where r(t) is an impulse response data structure, which corresponds to a distribution giving the amplitudes of echoes for each time of arrival of the corresponding echoes to the microphone, and where * is the convolution product.

The dry vocal signal data structure x(t) is a representation, computed and stored on a computer readable medium, of acoustical waves that corresponds to the signal propagated in free-field. The impulse response data structure r(t) is a representation, computed and stored on a computer readable medium, that characterizes the acoustic environment of the recording of the dry vocal signal data structure x(t). In some embodiments, the reverberation can result from the environment where the sound is being recorded as described above, but it can also be artificially added during the mixing or the post-production process of the vocal component, mainly for aesthetic reasons.

In the time-frequency domain, for non-negative spectrograms, this reverberation model can be approximated, as proposed in the article of Rita Singh, Raj Bhiksha and Paris Smaragdis, "Latent Variable-Based Decomposition of Dereverberati on and Multi Monaural Channel Signals," in IEEE International Conference on Audio and Speech Signal Processing, Dallas, Tex., USA, March 2010, by:

$$V_{f,t}^{rev,y} = \sum_{\tau=1}^{T} V_{f,t-\tau+1}^{x} R_{f,\tau}$$

where $V^{rev,y}$ is the spectrogram of the vocal signal data structure y(t), considered as affected by reverberation, $V^x$ is the spectrogram of the dry vocal signal data structure x(t), R is a reverberation matrix of dimensions F×T corresponding to the spectrogram of the impulse response data structure r(t), with F being the frequency dimension and T being the temporal dimension of R.

At Step 105 in FIG. 1, the process 100 obtains a mixture signal data structure w(t), for example, by reading from a computer readable medium or obtaining from a network location.

At Step 110, the process 100 creates a data structure representing a spectrogram of the mixture signal data structure w(t). This step may be performed by calculating the spectrogram V of the mixture signal data structure w(t) and storing V at a computer readable medium. In general, a spectrogram is defined as the modulus (or the square of the modulus) of the Short-Time Fourier Transform of a signal. In other embodiments, other time-frequency transformations can be used, such as a Constant Q Transform (CQT), or a Short-Time Fourier Transform followed by a filtering in the frequency domain (using filter banks in Mel or Bark scale for instance). For each time-frame of the signal, the spectrogram is composed by a vector that represents the instantaneous energy of the signal for each frequency point. In this embodiment, the spectrogram V is therefore a matrix of dimensions F×U, composed of positive real numbers. U is the total number of time-frames which divide the duration of the mixture signal data structure w(t), and F is the total number of frequency points, which may be between 200 and 2000. After step 110, two paths are defined, a first path and a second path, where the first path follows steps 115-140 and the second path follows steps 215-240. The first and second paths are referred to as the first part of the process and the second part of the process, respectively.

At Step 115, the process progresses to determining a cost function and parameters of the cost function using data structures representing spectrograms of the mixture signal data structure w(t), the vocal signal data structure y(t), and the background signal data structure z(t). This step involves first assuming that the vocal signal data structure y(t) is a dry vocal signal data structure, that is, the vocal signal data structure contains no reverberations.

With the foregoing assumption, the spectrogram of modelling of the mixture signal data structure is assumed to be the sum of the spectrogram of the vocal signal data structure $\hat{V}^y$, and the spectrogram of the background signal data structure $\hat{V}^z$. $\hat{V}^y$ is the data structure representing the spectrogram of the signal y(t), considered unaffected by the reverberation, and $\hat{V}^z$ is the data structure representing the spectrogram of the signal z(t). This additive model is commonly assumed within the framework of Non-negative Matrix Factorization. Note that the nomenclature $\hat{a}$ denotes an estimation of a, thus the data structures $\hat{V}^z$ and $\hat{V}^y$ in this step are estimates. The estimated spectrograms are created at a computer readable medium. This step involves the task of estimating the spectrograms of the two contributions with the constraint that their sum is approximately equal to the spectrogram of the mixture signal data structure. In a mathematical expression, this is equivalent to:

$$V \approx \hat{V} = \hat{V}^y + \hat{V}^z$$

In some embodiments, the modelling of the spectrogram of the vocal signal may be based on a source-filter voice production model, as proposed in Jean-Louis Durrieu et al. "An iterative approach to monaural musical mixture desoloing," in International Conference on Acoustics, Speech, and Signal Processing (ICASSP), Taipei, Taiwan, April 2009, pp. 105-108:

$$\hat{V}^y = (W_{F0} H_{F0}) \odot (W_K H_K)$$

where the first term corresponds to a modelling of the vocal source produced by the vibration of the vocal folds: $W_{F0}$ is a matrix representation composed of predefined harmonic atoms and $H_{F0}$ is a matrix of activation that controls at every instant which harmonic atoms of $W_{F0}$ are activated. The second term corresponds to a modelling of the vocal filter and reproduces the filtering that is performed in the vocal tract: $W_K$ is a matrix representation of filter atoms, and $H_K$ is a matrix of activation that controls at every instant which filter atoms of $W_K$ are activated. The operator $\odot$ corresponds to the element-wise matrix product (also known as the Hadamard product).

Similarly, the modelling of the musical background signal may be based on a generic Non-negative Matrix Factorization model:

$$\hat{V}^z = (W_R H_R)$$

where the columns of $W_R$ can be seen as elementary spectral patterns, and $H_R$ as a matrix of activation of these elementary spectral patterns over time.

At Step 115, when using the foregoing representations, the parameters being determined relate to the matrix representations of $H_{F0}$, $W_K$, $H_K$, $W_R$ and $H_R$. In order to estimate the parameters of these matrices, a cost-function C, based on an element-wise divergence d is used:

$$C = D(V \mid \hat{V}^y + \hat{V}^z) = \Sigma_{f,t} d(V_{ft} \mid \hat{V}_{ft}^y + \hat{V}_{ft}^z)$$

An implementation is herein contemplated in which the Itakura-Saito divergence, well-known by a person skilled in the art, is used. This divergence is obtained from the beta-divergence family when setting the parameter β=0 and writes:

$$d(a \mid b) = \frac{a}{b}\log\frac{a}{b} - 1$$

For reminder the beta-divergence family is defined by:

$$d_\beta(a \mid b) = \begin{cases} \frac{1}{\beta(\beta-1)}(a^\beta + (\beta-1)b^\beta - \beta a b^{\beta-1}), & \beta \in \mathbb{R} \setminus \{0, 1\} \\ a\log\frac{a}{b} - a + b, & \beta = 1 \\ \frac{a}{b} - \log\frac{a}{b} - 1, & \beta = 0 \end{cases}$$

where a and b are two real, positive scalars.

At Step 120, the cost-function C is thus minimized so as to estimate an optimal value of the parameters of each matrix. This minimization is performed iteratively using multiplicative update rules successively applied to each of the parameters of $H_{F0}$, $W_K$, $H_K$, $W_R$ and $H_R$ matrices.

For each parameter, an update rule can be obtained from the partial derivative of the cost-function C with respect to that parameter. More precisely, the partial derivative of the cost-function with respect to a given parameter is decomposed as a difference of two positive terms and the update rule of the considered parameters consists in a multiplication of the parameter by the ratio of the two positive terms. This technique ensure that parameters initialized with positive values stay positive at each iteration, and that partial derivatives that are null, corresponding to local minima, leave the value of the corresponding parameters unchanged. Using a such optimization algorithm, the parameters are updated so that the cost-function approaches a local minimum.

The update rules of the parameters of the spectrograms can be written as:

$$H_{F0} \leftarrow H_{F0} \odot \frac{W_{F0}^T\left((W_K H_K) \odot \left(V \odot \hat{V}^{\odot(\beta-2)}\right)\right)}{W_{F0}^T\left((W_K H_K) \odot (\hat{V}^{\odot(\beta-1)})\right)}$$

$$H_K \leftarrow H_K \odot \frac{W_K^T\left((W_{F0} H_{F0}) \odot \left(V \odot \hat{V}^{\odot(\beta-2)}\right)\right)}{W_K^T\left((W_{F0} H_{F0}) \odot (\hat{V}^{\odot(\beta-1)})\right)}$$

$$W_K \leftarrow W_K \odot \frac{\left((W_{F0} H_{F0}) \odot \left(V \odot \hat{V}^{\odot(\beta-2)}\right)\right) H_K^T}{\left((W_{F0} H_{F0}) \odot (\hat{V}^{\odot(\beta-1)})\right) H_K^T}$$

$$H_R \leftarrow H_R \odot \frac{W_R^T\left(V \odot \hat{V}^{\odot(\beta-2)}\right)}{W_R^T(\hat{V}^{\odot(\beta-1)})}$$

$$W_R \leftarrow W_R \odot \frac{\left(V \odot \hat{V}^{\odot(\beta-2)}\right) H_R^T}{(\hat{V}^{\odot(\beta-1)}) H_R^T}$$

where $\odot$ is the element-wise matrix (or vector) product operator; $.^{\odot(.)}$ is the element-wise exponentiation of a matrix by a scalar operator; $(.)^T$ is a matrix transpose operator. For this first part of the process, all the parameters of $H_{F0}$, $W_K$, $H_K$, $W_R$ and $H_R$ matrices are initialized with non-negative values randomly chosen.

At Step 130, the process involves using a tracking algorithm with the parameters of the spectrogram corresponding to the vocal component in order to identify frequency components of the vocal component with maximum energy in given timesteps. The matrix $H_{F0}$ is processed by using a tracking algorithm, such as a Viterbi algorithm, in order to select, for each time step, the frequency component (corresponding to one atom of the matrix $W_{F0}$) for which the energy is maximal at each time step while constraining this selection not being too far from the selection at the preceding time step. This step leads to the estimation of a melodic line corresponding to the melody sung by the singer.

At Step 140, the process then removes frequency components distant from the maximum energy at each timestep determined in Step 130. In some embodiments, this is accomplished by setting the elements of the matrix $H_{F0}$ that are distant from the melodic line from a predefined value to 0. By modifying the $H_{F0}$ matrix, a new matrix $H'_{F0}$ is thus obtained.

In process 100 of FIG. 1, steps 105 to 140 lead to the estimation of initial values for the parameters that will be iteratively re-estimated in the second part of the process (steps 215 to 240). Examples for each step were provided, but other methods for estimating the initial values of the spectrogram parameters, different than the one presented above, could be equally considered.

After Step 140, the assumption that the vocal signal data structure contains no reverberations is abandoned. At Step 215, the process determines cost function parameters using V (the data structure representing spectrogram of mixture signal data structure w(t)) and the data structures representing a spectrogram estimating a vocal signal data structure with reverberation and a spectrogram estimating a background signal data structure. Since the vocal component is considered as being affected by some reverberation, the modelling of the spectrogram of the vocal signal data structure considered as reverberated $\hat{V}^{rev,y}$, as a function of the spectrogram of the dry vocal signal $\hat{V}^x$, is expressed as:

$$[\hat{V}^{rev,y}]_{f,t} = [\hat{V}^x *_t R]_{f,t} = \sum_{\tau=1}^{T} \hat{V}^x_{f,t-\tau+1} R_{f,t}$$

where $*_t$ denotes a line-wise convolutional operator as defined in the right term of the above equation. The reverberation matrix R is composed of T time steps (of same duration as the time steps of the spectrogram of the mixture signal) and F frequency steps. In some embodiments, T is predefined by the user and is usually in the range 20-200, for instance 100.

Similarly to the previous discussion, the data structure representing the spectrogram of the dry vocal signal $\hat{V}^x$ is modelled as:

$$\hat{V}^x = (W_{F0} H_{F0}) \odot (W_K H_K)$$

and the spectrogram of the music background signal $\hat{V}^z$ is modelled as:

$$\hat{V}^z = (W_R H_R)$$

Thus, steps 215 to 240 involve the estimation of parameters for the matrices $H_{F0}$, $W_K$, $H_K$, $W_R$, $H_R$ and R that best approximate V (the spectrogram of the mixture signal data structure). Mathematically, this is written as:

$$V \approx \hat{V}^{rev} = \hat{V}^{rev,y} + \hat{V}^z$$

In order to estimate the parameters of these matrices, at step 215, a cost-function C, based on an element-wise divergence d is used:

$$C = D(V \mid \hat{V}^{rev,y} + \hat{V}^z) = \Sigma_{f,t} d(V_{ft} \mid \hat{V}_{ft}^{rev,y} + \hat{V}_{ft}^{z})$$

where divergence is obtained from the beta-divergence family, when setting the parameter $\beta=0$, as:

$$d(a \mid b) = \frac{a}{b} - \log\frac{a}{b} - 1$$

With similar models utilized in steps 115 and 215, the cost-function obtained in step 215 is similar to the cost-function in step 115.

At step 220, the cost function C is then minimized in order to estimate an optimal value for each parameter, in particular for the parameters of the reverberation matrix. The minimization is performed iteratively by means of multiplicative update rules, successively applied to each parameters of the matrices. For the matrices modelling the vocal component with reverberation, these updates rules are expressed as:

$$R \leftarrow R \odot \frac{\left(V \odot \hat{V}^{rev\odot(\beta-2)}\right) *_t \hat{V}^x}{\hat{V}^{rev\odot(\beta-1)} *_t \hat{V}^x}$$

$$H_{F0} \leftarrow H_{F0} \odot \frac{W_{F0}^T\left((W_K H_K) \odot \left(R *_t \left(V \odot \hat{V}^{rev\odot(\beta-2)}\right)\right)\right)}{W_{F0}^T\left((W_K H_K) \odot \left(R *_t \hat{V}^{rev\odot(\beta-1)}\right)\right)}$$

$$H_K \leftarrow H_K \odot \frac{W_K^T\left((W_{F0} H_{F0}) \odot \left(R *_t \left(V \odot \hat{V}^{rev\odot(\beta-2)}\right)\right)\right)}{W_K^T\left((W_{F0} H_{F0}) \odot \left(R *_t \hat{V}^{rev\odot(\beta-1)}\right)\right)}$$

$$W_K \leftarrow W_K \odot \frac{\left((W_{F0} H_{F0}) \odot \left(R *_t \left(V \odot \hat{V}^{rev\odot(\beta-2)}\right)\right)\right) H_K^T}{\left((W_{F0} H_{F0}) \odot \left(R *_t \hat{V}^{rev\odot(\beta-1)}\right)\right) H_K^T}$$

where $*_t$ denotes a line-wise convolutional operator between two matrices defined as $[A *_t B]_{f,\tau} = \Sigma_{\tau=t}^{T} A_{f,\tau} B_{f,\tau-t+1}$.

For the background component, similarly to the background component with no reverberation, the update rules are given by:

$$H_R \leftarrow H_R \odot \frac{W_R^T\left(V \odot \hat{V}^{rev\odot(\beta-2)}\right)}{W_R^T\left(\hat{V}^{rev\odot(\beta-1)}\right)}$$

$$W_R \leftarrow W_R \odot \frac{\left(V \odot \hat{V}^{rev\odot(\beta-2)}\right) H_R^T}{\left(\hat{V}^{rev\odot(\beta-1)}\right) H_R^T}$$

Analogous to Step 120, the update rules are obtained from the partial derivatives of the cost-function with respect to each corresponding parameter. These update rules thus relate to the type of cost-function that has been chosen, and then to the type of divergence used in building the cost-function. As such, all the update rules given above are examples derived from using beta-divergence. Other models may yield different rules.

Even though different models may yield different rules, embodiments of the disclosure obtain update rules from partial derivatives with respect to a specific parameter. As such, the update rule of the reverberation matrix R is generic in the sense that it is not a function of the modelling selected for the spectrogram of the dry vocal signal data structure $\hat{V}^x$ or the spectrogram of the music background signal data structure $\hat{V}^z$.

The estimation of the matrix $H_{F0}$ is accomplished iteratively starting with the initialization set to $H'_{F0}$, which is dubbed the activation matrix obtained from Step 140. Note that since the update rules are multiplicative, the coefficients of the matrix $H_{F0}$ that are initialized with 0 will remain null during the minimization of the cost-function of the second part of the process. The other parameters of the model, in particular those related to the specific contribution reverberated $\hat{V}^{rev,y}$ are initialized with non-negative random values.

When the value of the cost-function measuring the divergence between the spectrogram of the mixture signal V and the estimated spectrogram $\hat{V}^{rev}=\hat{V}^{rev,y}+\hat{V}^z$ falls below a certain predefined threshold, or when the number of iterations of the optimization process reaches a limit fixed beforehand, the process exits from the iteration loop and the values obtained for the matrices R, $H_{F0}$, $W_K$, $H_K$, $W_R$ and $H_R$, are dubbed the final estimates.

At Step 230, the estimated complex spectrograms of the dry vocal signal $\hat{V}^x$ and of the background signal $\hat{V}^z$ are obtained by means of a Wiener-like filtering applied to the time-frequency transform of the mixture signal. In some embodiments, this step involves creating time-frequency masks to estimate $\hat{V}^x$ and $\hat{V}^z$. An example of a mask (or Wiener mask) for the dry signal is $\hat{V}^x/(\hat{V}^{rev,y}+\hat{V}^z)$, and an example of a mask for the background signal is $\hat{V}^z/(\hat{V}^{rev,y}+\hat{V}^z)$. To obtain the time-frequency representations of the dry signal and the background signal, these masks are successively applied (element-wise multiplication) on the spectrogram of the mixture signal (V) and multiplied by the phase component of the time-frequency transform of the mixture signal (the spectrogram being defined as the modulus of the time-frequency transform). Thus for each source, a complex spectrogram is obtained.

Then, at step 240, the process obtains data structures representing the dry vocal signal x(t) and the background signal z(t) by using an inverse transformation on the spectrograms $\hat{V}^x$ and $\hat{V}^z$. The inverse transformation chosen is the inverse of the transformation performed in step 110.

The described embodiment is applied to the extraction of a specific component of interest which is preferably a vocal signal. However, the modelling of the reverberation affecting a component is generic and can be applied to any kind of component. In particular, the music background component might also be affected by reverberation. Moreover, any kind of model of non-negative spectrogram for a dry component can be equally used, in place of those described above. Furthermore, in the presented embodiment, the mixture signal is composed by two components. The generalization to any number of component is straightforward for a person skilled in the art.

Figure 2:
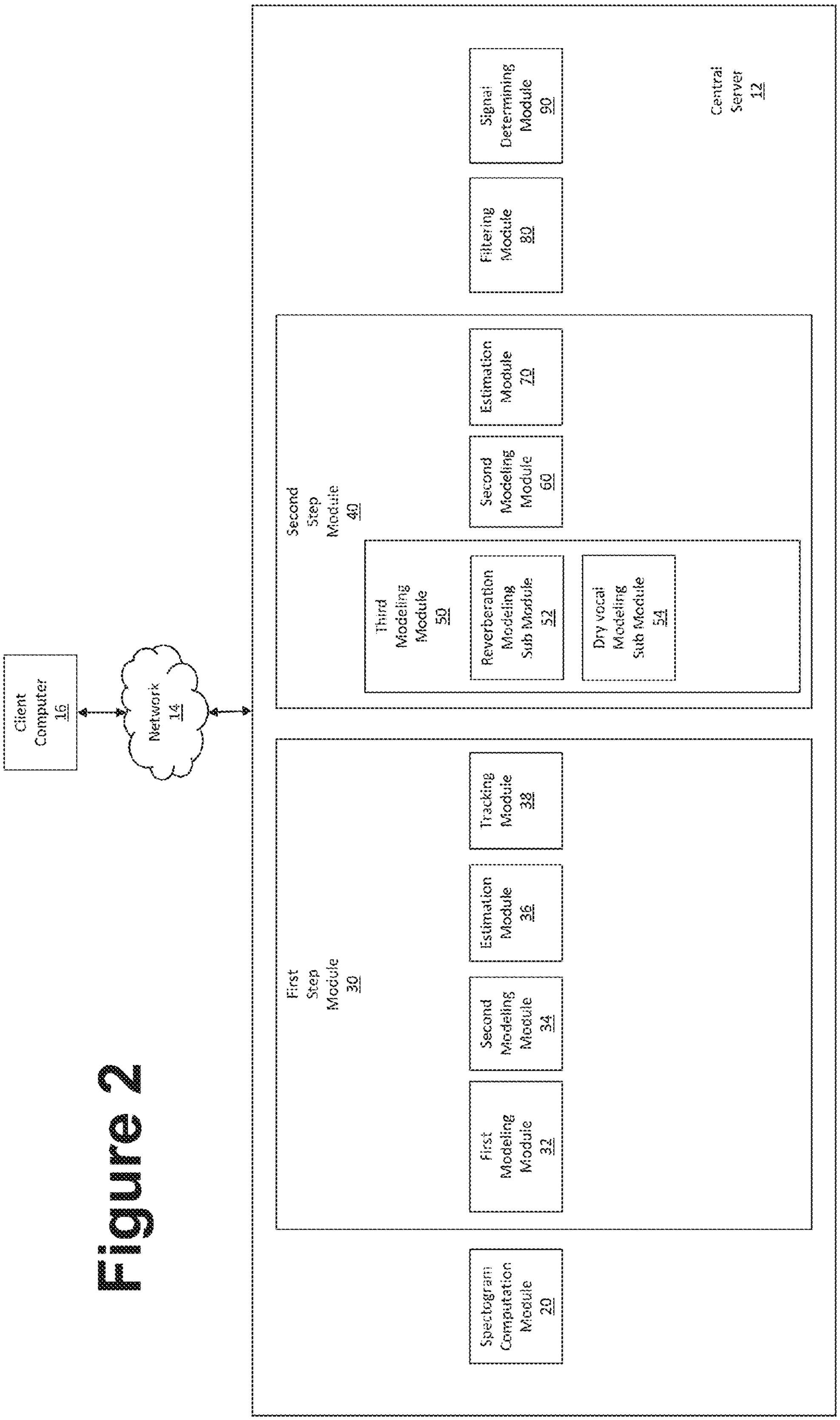
FIG. 2 is a schematic diagram of a system for transforming an audio mixture signal data structure into isolated audio component signal data structures according to one embodiment of the disclosure.

FIG. 2 is a schematic diagram of a system for transforming an audio mixture signal data structure into isolated audio component signal data structures according to one embodiment of the disclosure. The system depicted in FIG. 2 comprises a central server 12 connected, through a communication network 14 (e.g. the Internet) to a client computer 16. The schematic diagram depicted in FIG. 2 is only a sample embodiment, and the present application also contemplates systems for filtering audio mixture signals in order to provide isolated component signals that have a variety of alternative configurations. For example, the present application contemplates systems that reside entirely at a client computer or entirely at a central server as well as alternative configurations where the system is distributed between a client computer and a central server.

In the embodiment depicted in FIG. 2, the client computer 16 runs an application that enables a user to select a mixture signal w(t) and to listen to the selected mixture signal w(t). The mixture signal w(t) can be obtained through the communication network 14, for instance, from an online database via the Internet. Alternatively, the mixture signal w(t) can be obtained from a computer readable medium located locally at the client computer 16. In the embodiment depicted by FIG. 2, the mixture signal w(t) can be relayed, through the Internet, to the central server 12.

The central server 12 includes means of executing computations, e.g. one or more processors, and computer readable media, e.g. non-volatile memory. The computer readable media can store processor executable instructions for performing the process 100 depicted in FIG. 1. The means of executing computations included at the server 12 include a spectrogram computation module 20 configured to produce a spectrogram data structure V from the mixture signal data structure w(t) (in a manner such as that described in connection with element 110 of FIG. 1).

The server 12 also includes a first step module 30 configured to obtain (in a manner such as that described in connection with steps 115, 120, 130, and 140 of FIG. 1), from the spectrogram data structure V, a melodic line of the vocal signal under the form of an activation matrix $H'_{F0}$. The first step module 30 includes a first modeling module 32 configured to obtain a parametric spectrogram data structure $\hat{V}^y$ that models the spectrogram of the vocal signal data structure. The first step module 30 further includes a second modeling module 34 configured to obtain a parametric spectrogram data structure $\hat{V}^z$ that models the spectrogram of the background signal data structure. In addition, the first step module 30 includes an estimation module 36 configured to estimate the parameters of the parametric spectrogram data structures $\hat{V}^y$ and $\hat{V}^z$ using the spectrogram data structure V. The estimation module 36 is configured to perform an estimation (in a manner such as that described in connection with element 120 of FIG. 1) in which all values of the parameters of the parametric spectrogram data structures $\hat{V}^y$ and $\hat{V}^z$ are initialized using random non-negative values, except for the parameter $W_{F0}$ of the model $\hat{V}^y$ which is predefined and fixed during the estimation. The first step module 30 further includes a tracking module 38 (in a manner such as that described in connection with elements 130 and 140 FIG. 1) configured to obtain, from the activation matrix $H_{F0}$, an activation matrix $H'_{F0}$ filled with zeros outside an estimated melodic line.

The server 12 also includes a second step module 40 configured to obtain (in a manner such as that described in connection with elements 215 and 220 of FIG. 1), from the spectrogram data structure V, a parametric spectrogram data structure $\hat{V}^x$ that models the spectrogram of the dry voice signal and a parametric spectrogram data structure $\hat{V}^z$ that models the spectrogram of the background signal. The second step module 40 includes a third modeling module 50 configured to obtain a parametric spectrogram data structure $\hat{V}^{rev,y}$ that models the spectrogram of the vocal signal affected by reverberation. The third modeling module 50 includes a reverberation modeling sub-module 52 configured to obtain a model of the reverberation matrix R. The third modeling module 50 further includes a dry vocal modelling sub-module 54 to obtain a parametric spectrogram data structure $\hat{V}^x$ that models the spectrogram of the dry voice signal (similar to the first modeling module 32).

The second step module 40 further includes a second modeling module 60 configured to obtain a parametric spectrogram data structure $\hat{V}^z$ that models the spectrogram of the background signal (similar to the second modeling module 34). In addition, the second step module 40 includes an estimation module 70 configured to estimate the parameters of the parametric spectrogram data structures $\hat{V}^{rev,y}$ and $\hat{V}^z$ using the spectrogram data structure V. The estimation module 70 is configured to perform an estimation (in a manner such as that described in connection with element 220 of FIG. 1) in which, the values of $H_{F0}$ are initialized using the values of $H'_{F0}$ estimated by the first step module 30, the values of $W_{F0}$ are predefined and fixed during the estimation, and all values of the remaining parameters of the parametric spectrogram data structures $\hat{V}^{rev,y}$ and $\hat{V}^z$ are initialized using random non-negative values.

Furthermore, the central server 12 includes a filtering module 80 configured to implement Wiener filtering for determining the spectrogram data structure $\hat{V}^x$ of the dry vocal signal data structure x(t) and the spectrogram data structure $\hat{V}^z$ of the background signal data structure z(t) from the optimized parameters in a manner such as that described in connection with element 230 of the process described by FIG. 1. Finally, the central server 12 includes a signal determining module 90 configured to determine the dry vocal signal data structure x(t) from the spectrogram data structure $\hat{V}^x$ (in a manner such as that described in connection with element 240 of FIG. 1) and to determine the background signal data structure z(t) from the spectrogram data structure $\overline{V}^z$ (in a manner such as that described in connection with element 240 of FIG. 1). The central server 12, after processing the provided signal and obtaining the dry vocal signal data structure x(t) and the audio background signal data structure z(t), can transmit both output signal data structures to the client computer 16.

Figure 3:
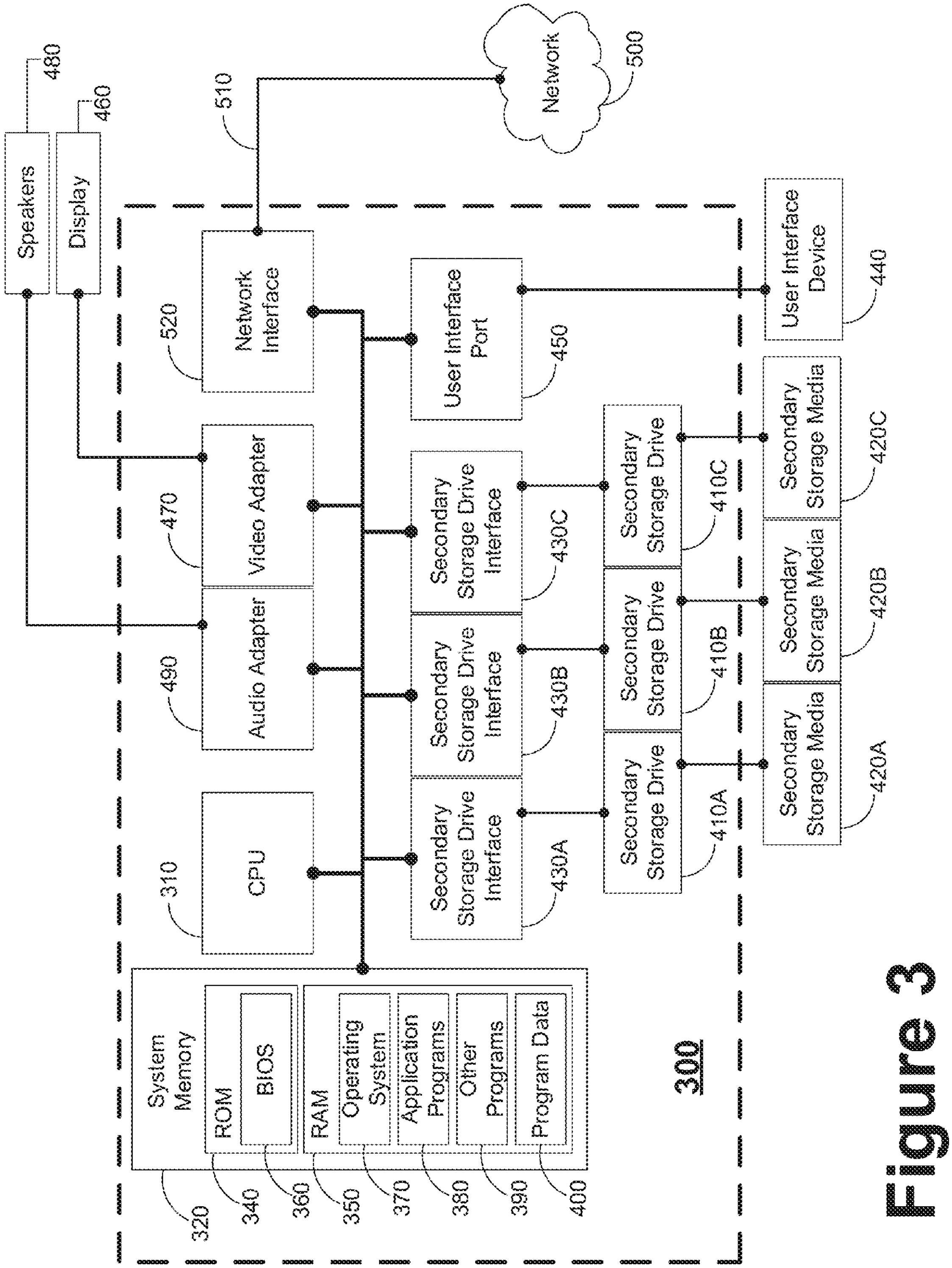
FIG. 3 is a block diagram illustrating an example computer environment at which the system for transforming an audio mixture signal data structure into isolated audio component signal data structures of FIG. 2 may reside.

FIG. 3 is a block diagram illustrating an example of the computer environment in which the system for transforming an audio mixture signal data structure into a component audio signal data structures of FIG. 2 may reside. Those of ordinary skill in the art will understand that the meaning of the term "computer" as used in the exemplary environment in which embodiments of the disclosure may be implemented is not limited to a personal computer but may also include other microprocessor or microcontroller-based systems. For example, the embodiments may be implemented in an environment comprising hand-held devices, smart phones, tablets, multi-processor systems, microprocessor based or programmable consumer electronics, network PCs, minicomputers, mainframe computers, Internet appliances, and the like.

The computer environment includes a computer 300, which includes a central processing unit (CPU) 310, a system memory 320, and a system bus 330. The system memory 320 includes both read only memory (ROM) 340 and random access memory (RAM) 350. The ROM 34 stores a basic input/output system (BIOS) 360, which contains the basic routines that assist in the exchange of information between elements within the computer, for example, during start-up. The RAM 350 stores a variety of information including an operating system 370, an application programs 380, other programs 390, and program data 400. The computer 300 further includes secondary storage drives 410A, 410B, and 410C, which read from and writes to secondary storage media 420A, 420B, and 420C, respectively. The secondary storage media 420A, 420B, and 420C may include but is not limited to flash memory, one or more hard disks, one or more magnetic disks, one or more optical disks (e.g. CDs, DVDs, and Blu-Ray discs), and various other forms of computer readable media. Similarly, the secondary storage drives 410A, 410B, and 410C may include solid state drives (SSDs), hard disk drives (HDDs), magnetic disk drives, and optical disk drives. In some implementations, the secondary storage media 420A, 420B, and 420C may store a portion of the operating system 370, the application programs 380, the other programs 390, and the program data 400.

The system bus 330 couples various system components, including the system memory 320, to the CPU 310. The system bus 330 may be of any of several types of bus structures including a memory bus or memory controller, a peripheral bus, and a local bus using any of a variety of bus architectures. The system bus 330 connects to the secondary storage drives 410A, 410B, and 410C via a secondary storage drive interfaces 430A, 430B, and 430C, respectively. The secondary storage drives and their associated computer-readable media provide nonvolatile storage of computer readable instructions, data structures, programs, and other data for the computer 300.

A user may enter commands and information into the computer 300 through user interface device 440. User interface device 440 may be but is not limited to any of a microphone, a touch screen, a touchpad, a keyboard, and a pointing device, e.g. a mouse or a joystick. User interface device 440 is connected to the CPU 310 through port 450. The port 450 may be but is not limited to any of a serial port, a parallel port, a universal serial bus (USB), a 1394 bus, and a game port. The computer 300 may output various signals through a variety of different components. For example, in FIG. 3 a graphical display 460 is connected to the system bus 330 via video adapter 470. The environment in which embodiments of the disclosure may be carried out may also include a variety of other peripheral output devices including but not limited to speakers 480, which are connected to the system bus 330 via audio adaptor 490.

The computer 300 may operate in a networked environment by utilizing connections to one or more devices within a network 500, including another computer, a server, a network PC, a peer device, or other network node. These devices typically include many or all of the components found in the example computer 300. For example, the example computer 300 depicted in FIG. 3 may correspond to the client computer 16 depicted in FIG. 2. Similarly, the example computer 300 depicted in FIG. 3 may also be representative of the central server 12 depicted in FIG. 2. In FIG. 3, the logical connections utilized by the computer 300 include a network link 510. Possible implementations of the network link 510 include a local area network (LAN) link and a wide area network (WAN) link, such as the Internet. The computer 30 is connected to the network 500 through a network interface 520. Data may be transmitted across the network link 510 through a variety of transport standards including but not limited to Ethernet, SONET, DSL, T-1, T-3, and the like via such physical implementations as coaxial cable, twisted copper pairs, fiber optics, and the like. In a networked environment in which embodiments of the disclosure may be practiced, programs or portions thereof executed by the computer 30 may be stored on other devices connected to the network 500.

Comparative tests were performed to evaluate the performance of the proposed embodiment of the disclosure with other known processes. The first system performs the extraction of the vocal part by considering a Non-negative Matrix Factorization model based on source-filter voice production model, without modelling the reverberation. The second system corresponds to the process described above and therefore explicitly models the effects of reverberation on the vocal component. The third system corresponds to a theoretical limit that can be reached using Weiner masks computed from the actual spectrogram of the original separated sources, available for our experiments.

In order to quantify the results for the different systems, objective metrics commonly used in the domain of audio source separation are computed. These metrics are the Signal to Distortion Ratio (SDR), which corresponds to a global quantitative metric; the Signal to Artifact Ratio (SAR), which quantifies the amount of artifacts present in the separated components; and the Signal to Interference Ratio (SIR), which quantifies the amount of residual interferences between the separated components. For all three metrics, a higher the value signifies a higher performance system.

Figure 4:
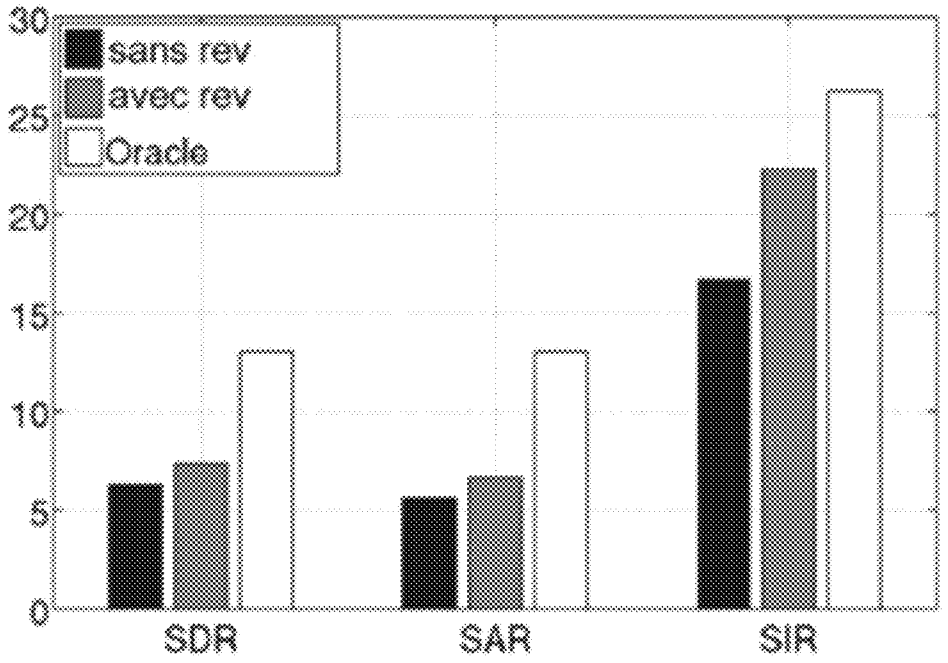
FIG. 4 is a graph providing results of audio mixture separation tests of a process according to an implementation of an embodiment of the disclosure and of various processes of the prior art.
Figure 5:
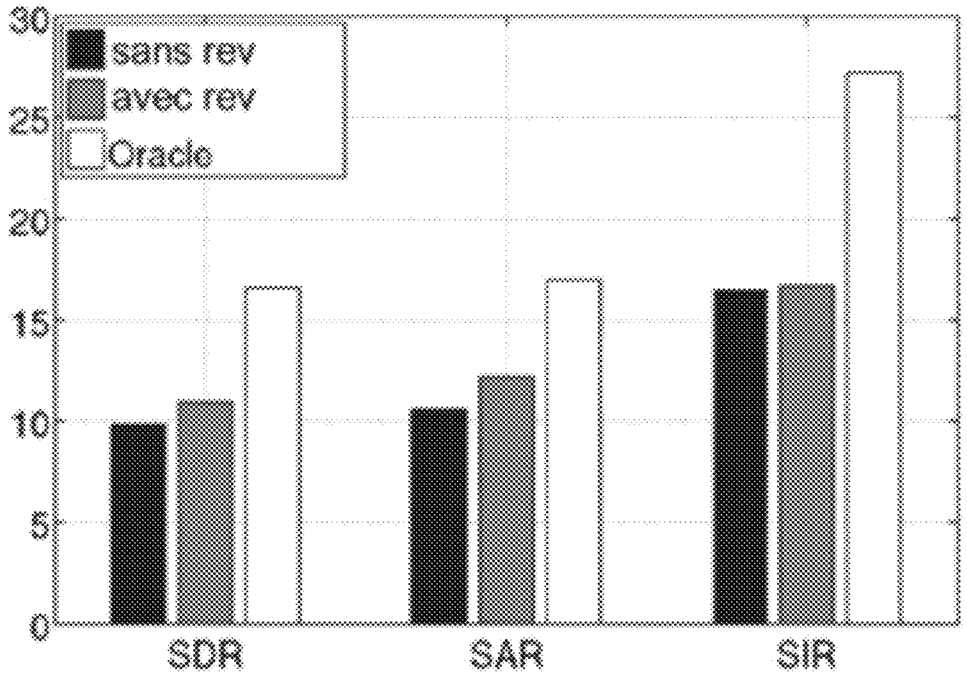
FIG. 5 is a graph providing results of audio mixture separation tests of a process according to an implementation of an embodiment of the disclosure and various processes of the prior art.

Results are presented in FIG. 4 for the vocal component and in FIG. 5 for the music background signal. In both FIGS. 4 and 5, the second system with reverberation has increased separation ratios compared to the first system based on Non-negative Matrix Factorization. The y-axis in both FIGS. 4 and 5 are measured in decibels (dB). The SIR is particularly increased in FIG. 4 by more than 5 dB. This is mainly because without accounting for reverberation, a large part of the reverberation of the voice leaks in the music model. This phenomenon is also audible in excerpts with strong reverberation. In some embodiments, with the reverberation model the reverberation is mainly heard within the separated voice component and is almost inaudible within the separated music. The system based on the presented embodiments thus improves the performance of the separation for any metric and any source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the embodiments (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the disclosure and does not pose a limitation on the scope of the application unless otherwise claimed. No language in the specification should be construed as indicating any non-claimed element as essential to the practice of the invention.

Preferred embodiments of the disclosure are described herein, including the best mode known to the inventors for carrying out the embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the present application unless otherwise indicated herein or otherwise clearly contradicted by context.

The invention claimed is:

1. A non-transitory computer readable medium containing computer executable instructions for separating a dry acoustic signal x(t) from a mixture acoustic signal w(t), the mixture acoustic signal w(t) comprising a dry acoustic signal affected by reverberation y(t) and a background acoustic signal z(t), the medium comprising:

computer executable instructions for obtaining from the computer readable medium the mixture acoustic signal w(t), the mixture acoustic signal w(t) being an audio data structure comprising the dry acoustic signal affected by reverberation y(t) and the background acoustic signal z(t), the dry acoustic signal affected by reverberation v(t) being an audio data structure comprising the dry acoustic signal x(t) and echoes;

computer executable instructions for applying a time-frequency transform to the mixture acoustic signal w(t) to obtain a spectrogram of the mixture acoustic signal V;

computer executable instructions to obtain a model of a spectrogram of the mixture acoustic signal $\hat{V}^{rev}$,$\hat{V}^{rev}$ comprising the sum of a model of a spectrogram of the dry acoustic signal affected by reverberation $\hat{V}^{rev,y}$ and a model of a spectrogram of the background acoustic signal $\hat{V}^{z}$, wherein the model of the spectrogram of the dry acoustic signal affected by reverberation is related to the model of the spectrogram of the dry acoustic signal $\hat{V}^{x}$ through a reverberation matrix R;

computer executable instructions to produce iteratively an estimation of the model of the spectrogram of the background acoustic signal $\hat{V}^{z}$, the model of the spectrogram of the dry acoustic signal $\hat{V}^{x}$, and the reverberation matrix R, so as to minimize a cost-function (C) between the spectrogram of the mixture acoustic signal V and the model of the spectrogram of the mixture acoustic signal $\hat{V}^{rev}$;

computer executable instructions to obtain the spectrogram of the dry acoustic signal by filtering the spectrogram of the mixture acoustic signal V using the estimated model of the spectrogram of the dry acoustic signal $\hat{V}^{x}$, the estimated model of the spectrogram of the background acoustic signal $\hat{V}^{z}$, and the model the spectrogram of the dry acoustic signal affected by reverberation $\hat{V}^{rev,y}$;

computer executable instructions to obtain the dry acoustic signal x(t) by using an inverse time-frequency transformation on the spectrogram of the dry acoustic signal; and computer executable instructions to store the dry acoustic signal x(t).

2. The non-transitory computer readable medium of claim 1, wherein the model of the spectrogram of the dry acoustic signal affected by reverberation is related to the model of the spectrogram of the dry acoustic signal $\hat{V}^x$ according to:

$$\hat{V}^{rev,y}_{f,t} = \sum_{\tau=1}^{T} \hat{V}^x_{f,t-\tau+1} R_{f,t}$$

where the reverberation matrix R is a matrix of dimensions FxT, f is a frequency index, t is a time index, and τ an integer between 1 and T.

3. The non-transitory computer readable medium of claim 2, wherein the cost-function (C) is built using an element-wise divergence (d) between the spectrogram of the mixture acoustic signal V and the model of spectrogram of the mixture acoustic signal $\hat{V}^{rev}$, wherein the divergence is the beta-divergence defined by:

$$d_\beta(a\mid b) = \begin{cases} \frac{1}{\beta(\beta-1)}(a^\beta + (\beta-1)b^\beta - \beta a b^{\beta-1}), & \beta \in \mathbb{R}\setminus\{0,1\} \\ a\log\frac{a}{b} - a + b, & \beta = 1 \\ \frac{a}{b} - \log\frac{a}{b} - 1, & \beta = 0 \end{cases}$$

where a and b are two real positive scalars.

4. The non-transitory computer readable medium of claim 3, wherein the minimization of the cost-function (C) from which an estimation of the reverberation matrix R is obtained, is performed by means of a multiplicative update rule in the form:

$$R \leftarrow R \odot \frac{\left(V \odot \hat{V}^{rev\odot(\beta-2)}\right) *_t \hat{V}^x}{\hat{V}^{rev\odot(\beta-1)} *_t \hat{V}^x}$$

where $\hat{V}^{rev}=\hat{V}^{rev,y}+\hat{V}^Z$; and where ⊙ is the element-wise matrix product operator;

$.^{\odot(.)}$ is the element-wise exponentiation of a matrix by a scalar operator; $(.)^T$ is the matrix transpose operator; $*_t$ denotes a line-wise convolutional operator between two matrices defined as $[A*_tB]_{f,\tau}=\Sigma_{\tau=t}^{T}A_{f,t}B_{f,\tau-t+1}$.

5. The non-transitory computer medium of claim 3, wherein the minimization of the cost-function (C) from which first stage estimates of the matrices $H_{F0}$, $W_K$, $H_K$, $W_R$ and $H_R$ are obtained, is performed by means of multiplicative update rules in the form:

$$H_{F0} \leftarrow H_{F0} \odot \frac{W_{F0}^T\left((W_K H_K) \odot \left(V \odot \hat{V}^{\odot(\beta-2)}\right)\right)}{W_{F0}^T\left((W_K H_K) \odot (\hat{V}^{\odot(\beta-1)})\right)}$$

$$H_K \leftarrow H_K \odot \frac{W_K^T\left((W_{F0} H_{F0}) \odot \left(V \odot \hat{V}^{\odot(\beta-2)}\right)\right)}{W_K^T\left((W_{F0} H_{F0}) \odot (\hat{V}^{\odot(\beta-1)})\right)}$$

$$W_K \leftarrow W_K \odot \frac{\left((W_{F0} H_{F0}) \odot \left(V \odot \hat{V}^{\odot(\beta-2)}\right)\right) H_K^T}{\left((W_{F0} H_{F0}) \odot (\hat{V}^{\odot(\beta-1)})\right) H_K^T}$$

-continued $$H_R \leftarrow H_R \odot \frac{W_R^T\left(V \odot \hat{V}^{\odot(\beta-2)}\right)}{W_R^T(\hat{V}^{\odot(\beta-1)})}$$

$$W_R \leftarrow W_R \odot \frac{\left(V \odot \hat{V}^{\odot(\beta-2)}\right) H_R^T}{(\hat{V}^{\odot(\beta-1)}) H_R^T}$$

with $\hat{V}=\hat{V}^x+\hat{V}^Z$, $\hat{V}^z=(W_RH_R)$, et $\hat{V}^x=(W_{F0}H_{F0})\odot(W_KH_K)$; where $W_{F0}$ is a matrix composed of predefined harmonic atoms, $H_{F0}$ is a matrix that models the activation of the harmonic atoms of $W_{F0}$ over time, $W_K$ is a matrix of filter atoms; $H_K$ is a matrix that models the activation of the filter atoms of $W_K$ over time; $W_R$ is a matrix whose columns are composed of elementary spectral patterns and $H_R$ is a matrix that model the activation of the elementary spectral patterns of $W_R$ over time; and where ⊙ is the element-wise matrix product operator;

$.^{\odot(.)}$ is the element-wise exponentiation of a matrix by a scalar operator; $(.)^T$ is the matrix transpose operator.

6. The non-transitory computer readable medium of claim 1, wherein the dry acoustic signal is a vocal signal, and the model of the spectrogram of the dry acoustic signal $\hat{V}^x$ is chosen as:

$$\hat{V}^x=(W_{F0}H_{F0})\odot(W_KH_K)$$

where $W_{F0}$ is a matrix composed of predefined harmonic atoms, $H_{F0}$ is a matrix that models the activation of the harmonic atoms of $W_{F0}$ over time, $W_K$ is a matrix of filter atoms; $H_K$ is a matrix that models the activation of the filter atoms of $W_K$ over time, and where ⊙ is the element-wise matrix product operator.

7. The non-transitory computer medium of claim 6, wherein the minimization of the cost-function (C) from which estimates of the matrices $H_{F0}$, $W_K$, $H_K$ are obtained, is performed by means of multiplicative update rules in the form:

$$H_{F0} \leftarrow H_{F0} \odot \frac{W_{F0}^T\left((W_K H_K) \odot \left(R *_t \left(V \odot \hat{V}^{rev\odot(\beta-2)}\right)\right)\right)}{W_{F0}^T\left((W_K H_K) \odot \left(R *_t \hat{V}^{rev\odot(\beta-1)}\right)\right)}$$

$$H_K \leftarrow H_K \odot \frac{W_K^T\left((W_{F0} H_{F0}) \odot \left(R *_t \left(V \odot \hat{V}^{rev\odot(\beta-2)}\right)\right)\right)}{W_K^T\left((W_{F0} H_{F0}) \odot \left(R *_t \hat{V}^{rev\odot(\beta-1)}\right)\right)}$$

$$W_K \leftarrow W_K \odot \frac{\left((W_{F0} H_{F0}) \odot \left(R *_t \left(V \odot \hat{V}^{rev\odot(\beta-2)}\right)\right)\right) H_K^T}{\left((W_{F0} H_{F0}) \odot \left(R *_t \hat{V}^{rev\odot(\beta-1)}\right)\right) H_K^T}$$

with $\hat{V}=\hat{V}^{rev,y}+\hat{V}^Z$; and where ⊙ is the element-wise matrix product operator;

$.^{\odot(.)}$ is the element-wise exponentiation of a matrix by a scalar operator; $(.)^T$ is the matrix transpose operator; $*_t$ denotes a line-wise convolutional operator between two matrices defined as $[A*_tB]_{f,\tau}=\Sigma_{\tau=t}^{T}A_{f,\tau}B_{f,\tau-t+1}$, where f is a frequency index, t is a time index, and τ an integer between 1 and T.

8. The non-transitory computer medium of claim 1, wherein the model of spectrogram of the background acoustic signal $\hat{V}^z$ is set to a standard Non-negative Matrix Factorization model:

$$\hat{V}^z=(W_RH_R)$$

where $W_R$ is a matrix whose columns are composed of elementary spectral patterns and $H_R$ is a matrix that model the activation of the elementary spectral patterns of $W_R$ over time.

9. The non-transitory computer medium of claim 8, wherein the minimization of the cost-function (C) from which estimates of the matrices $H_R$ and $W_R$ are obtained, is performed by means of multiplicative update rules in the form:

$$H_R \leftarrow H_R \odot \frac{W_R^T(V \odot \hat{V}^{rev\odot(\beta-2)})}{W_R^T(\hat{V}^{rev\odot(\beta-1)})}$$

$$W_R \leftarrow W_R \odot \frac{(V \odot \hat{V}^{rev\odot(\beta-2)})H_R^T}{(\hat{V}^{rev\odot(\beta-1)})H_R^T}$$

with $\hat{V}^{rev}=\hat{V}^{rev,y}+\hat{V}^{Z}$; and where $\odot$ is the element-wise matrix product operator;

$.^{\odot(.)}$ is the element-wise exponentiation of a matrix by a scalar operator; $(.)^T$ is the matrix transpose operator.

10. The non-transitory computer medium of claim 1, further comprising computer readable executable instructions to separate, from the mixture acoustic signal w(t), a specific acoustic signal and a background acoustic signal without considering the reverberation, wherein parameters from the specific acoustic signal and parameters from the background acoustic signal are parameters from a first stage and are used to initialize the corresponding parameters in the model of spectrogram of the specific acoustic signal $\hat{V}^{rev,y}$ wherein the corresponding parameters are parameters from a second stage.

11. The non-transitory computer medium of claim 10, wherein the parameters from the specific acoustic signal and the parameters from the background acoustic signal obtained at the first stage use a similar process to as obtaining the corresponding parameters in the second stage.

12. The non-transitory computer medium of claim 10, wherein the first stage comprises, after having performed the minimization of the cost-function, the use of a tracking algorithm for estimating a melody line from the activation matrix $H_{F0}$ in the model of spectrogram of the specific acoustic contribution without reverberation, this tracking algorithm being preferably a Viterbi algorithm, resetting to 0 of the elements of the activation matrix $H_{F0}$ that are too far from the melodic line estimated using the tracking algorithm, and using the elements of this new activation matrix $H_{F0}$ as initial values for the activation matrix $H_{F0}$ of the model of spectrogram of the dry acoustic signal affected by reverberation $\hat{V}^{rev,y}$ in the second stage, the other parameters of the model of spectrogram of the mixture signal $\hat{V}^{rev}$ being initialized with positive random values.

13. A system for extracting a reference representation from a mixture representation and generating a residual representation, the reference representation, the mixture representation, and the residual representation being time-frequency representations of collections of acoustical waves stored on computer readable media in audio data structures, the system comprising:

a processor configured to:

obtain a spectrogram of the mixture representation V by applying a time-frequency transform to the mixture representation;

obtain a model of a spectrogram of the mixture representation $\hat{V}^{rev}$, $\hat{V}^{rev}$ comprising the sum of a model of the reference representation $\hat{V}^{rev,y}$ and a model of the residual representation $\hat{V}^{z}$, wherein the model of the spectrogram of the reference representation is related to a model of a spectrogram of a dry signal representation $\hat{V}^{x}$ through a reverberation matrix R;

produce iteratively an estimation of the model of spectrogram of the residual representation $\hat{V}^{z}$, the model of the spectrogram of the dry signal representation $\hat{V}^{x}$, and the reverberation matrix R, so as to minimize a cost-function (C) between the spectrogram of the mixture representation V and the model of the spectrogram of the mixture representation $\hat{V}^{rev}$;

obtain the spectrogram of the dry signal representation by filtering the spectrogram of the mixture representation V using the estimated model of the spectrogram of the dry signal representation, the estimated model of the spectrogram of the residual representation, and the model of the reference representation;

obtain the dry signal representation by using an inverse time-frequency transformation on the spectrogram of the dry signal representation; and store the dry signal representation.

14. The system of claim 13, wherein the model of the spectrogram of the reference representation is related to the model of the spectrogram of the dry signal representation $\hat{V}^{x}$ according to:

$$\hat{V}_{f,t}^{rev,y} = \sum_{\tau=1}^{T} \hat{V}_{f,t-\tau+1}^{x} R_{f,t}$$

where the reverberation matrix R is a matrix of dimensions FxT, f is a frequency index, t is a time index, and $\tau$ an integer between 1 and T.

15. The system of claim 14, wherein the cost-function (C) is built using an element-wise divergence (d) between the spectrogram of the mixture representation V and the model of spectrogram of the mixture representation $\hat{V}^{rev}$, wherein the divergence is the beta-divergence defined by:

$$d_\beta(a \mid b) = \begin{cases} \frac{1}{\beta(\beta-1)}(a^\beta + (\beta-1)b^\beta - \beta a b^{\beta-1}), & \beta \in \mathbb{R} \setminus \{0, 1\} \\ a \log\frac{a}{b} - a + b, & \beta = 1 \\ \frac{a}{b} - \log\frac{a}{b} - 1, & \beta = 0 \end{cases}$$

where a and b are two real positive scalars.

16. The system of claim 15, wherein the minimization of the cost-function (C) from which an estimation of the reverberation matrix R is obtained, is performed by means of a multiplicative update rule in the form:

$$R \leftarrow R \odot \frac{(V \odot \hat{V}^{rev\odot(\beta-2)}) *_t \hat{V}^{x}}{\hat{V}^{rev\odot(\beta-1)} *_t \hat{V}^{x}}$$

where $\hat{V}^{rev}=\hat{V}^{rev,y}+\hat{V}^{Z}$; and where $\odot$ is the element-wise matrix product operator;

$.^{\odot(.)}$ is the element-wise exponentiation of a matrix by a scalar operator; $(.)^T$ is the matrix transpose operator; $*_t$ denotes a line-wise convolutional operator between two matrices defined as $[A *_t B]_{f,\tau}=\Sigma_{\tau=t}^{T} A_{f,\tau} B_{f,\tau-t+1}$.

17. The system of claim 13, wherein the dry signal representation is a vocal signal, and the model of the spectrogram of the dry signal representation $\hat{V}^x$ is chosen as:

$$\hat{V}^x=(W_{F0}H_{F0})\odot(W_K H_K)$$

where $W_{F0}$ is a matrix composed of predefined harmonic atoms, $H_{F0}$ is a matrix that models the activation of the harmonic atoms of $W_{F0}$ over time, $W_K$ is a matrix of filter atoms; $H_K$ is a matrix that models the activation of the filter atoms of $W_K$ over time, and where is the element-wise matrix product operator.

18. The system of claim 17, wherein the minimization of the cost-function (C) from which estimates of the matrices $H_{F0}$, $W_K$, $H_K$ are obtained, is performed by means of multiplicative update rules in the form:

$$H_{F0} \leftarrow H_{F0} \odot \frac{W_{F0}^T\left((W_K H_K) \odot \left(R *_t \left(V \odot \hat{V}^{rev\odot(\beta-2)}\right)\right)\right)}{W_{F0}^T\left((W_K H_K) \odot \left(R *_t \hat{V}^{rev\odot(\beta-1)}\right)\right)}$$

$$H_K \leftarrow H_K \odot \frac{W_K^T\left((W_{F0} H_{F0}) \odot \left(R *_t \left(V \odot \hat{V}^{rev\odot(\beta-2)}\right)\right)\right)}{W_K^T\left((W_{F0} H_{F0}) \odot \left(R *_t \hat{V}^{rev\odot(\beta-1)}\right)\right)}$$

$$W_K \leftarrow W_K \odot \frac{\left((W_{F0} H_{F0}) \odot \left(R *_t \left(V \odot \hat{V}^{rev\odot(\beta-2)}\right)\right)\right) H_K^T}{\left((W_{F0} H_{F0}) \odot \left(R *_t \hat{V}^{rev\odot(\beta-1)}\right)\right) H_K^T}$$

with $\hat{V}^{rev}=\hat{V}^{rev,y}+\hat{V}^{Z}$; and where $\odot$ is the element-wise matrix product operator;

$.^{\odot(.)}$ is the element-wise exponentiation of a matrix by a scalar operator; $(.)^T$ is the matrix transpose operator; $*_t$ denotes a line-wise convolutional operator between two matrices defined as $[A *_t B]_{f,\tau}=\Sigma_{\tau=t}^{T} A_{f,\tau} B_{f,\tau-t+1}$, where f is a frequency index, t is a time index, and $\tau$ an integer between 1 and T.

19. The system of claim 13, wherein the model of spectrogram of the residual representation $\hat{V}^z$ is set to a standard Non-negative Matrix Factorization model:

$$\hat{V}^z=(W_R H_R)$$

where $W_R$ is a matrix whose columns are composed of elementary spectral patterns and $H_R$ is a matrix that model the activation of the elementary spectral patterns of $W_R$ over time.

20. The system of claim 19, wherein the minimization of the cost-function (C) from which estimates of the matrices $H_R$ and $W_R$ are obtained, is performed by means of multiplicative update rules in the form:

$$H_R \leftarrow H_R \odot \frac{W_R^T\left(V \odot \hat{V}^{rev\odot(\beta-2)}\right)}{W_R^T\left(\hat{V}^{rev\odot(\beta-1)}\right)}$$

$$W_R \leftarrow W_R \odot \frac{\left(V \odot \hat{V}^{rev\odot(\beta-2)}\right) H_R^T}{\left(\hat{V}^{rev\odot(\beta-1)}\right) H_R^T}$$

with $\hat{V}^{rev}=\hat{V}^{rev,y}+\hat{V}^{Z}$; and where $\odot$ is the element-wise matrix product operator;

$.^{\odot(.)}$ is the element-wise exponentiation of a matrix by a scalar operator; $(.)^T$ is the matrix transpose operator.

* * * * *